March 2, 1971   C. A. MORCHAND   3,566,482
EDUCATIONAL DEVICE

Filed Oct. 24, 1968                                      2 Sheets-Sheet 1

INVENTOR.
Charles A. Morchand

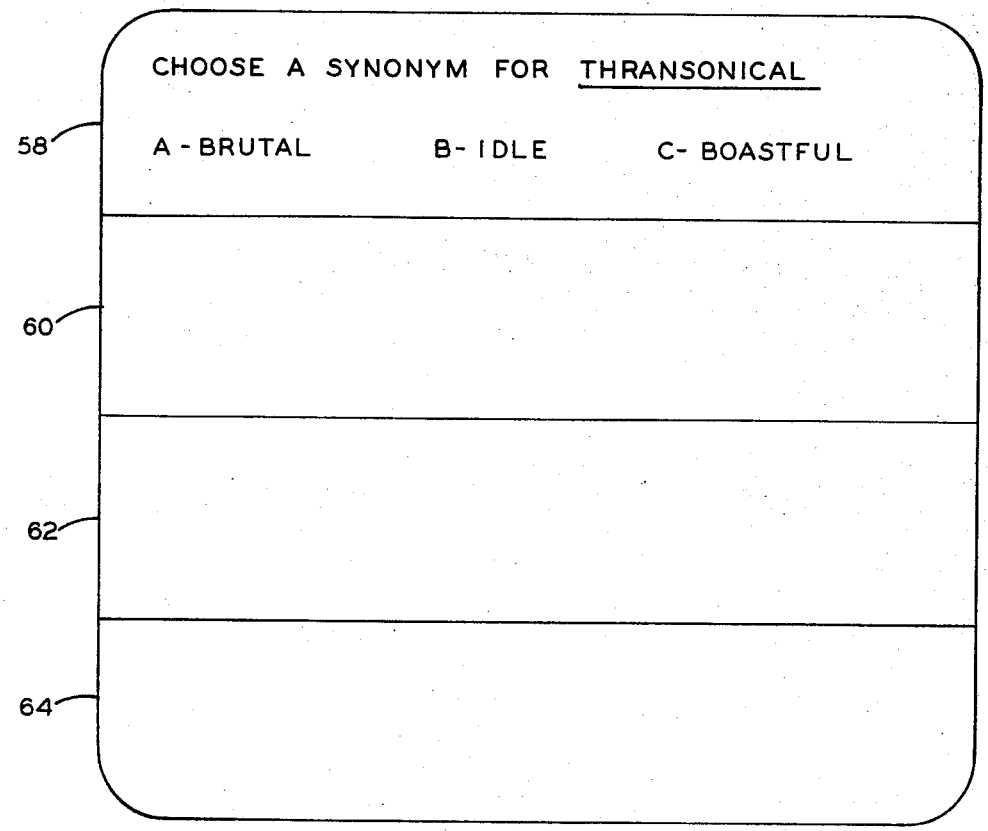

United States Patent Office 3,566,482
Patented Mar. 2, 1971

3,566,482
EDUCATIONAL DEVICE
Charles A. Morchand, New York, N.Y., assignor to Data-Plex Systems, Inc., New York, N.Y.
Filed Oct. 24, 1968, Ser. No. 770,275
Int. Cl. G09b 7/08
U.S. Cl. 35—9
5 Claims

ABSTRACT OF THE DISCLOSURE

The device generates a group of signals representing a plurality of items of information arranged to form a composite picture on the cathode ray tube of a remote receiver. The receiver includes switches for selecting portions of the composite picture for display.

This invention is related generally to an educational and amusement device and more particularly to a selectively controlled information presentation device.

New methods of teaching skills, testing knowledge, determining abilities, presenting problems and the like are being developed to help teach individuals in various fields and areas of interest. The use of a cathode ray tube as a tool in developing the new teaching and training methods has been significant.

Reference is made to my issued U.S. Pats. 3,008,000; 3,180,931 and 3,256,386 the specifications of which describe systems suitable for educational or amusement use. These systems have created a demand for more versatile systems. It is, accordingly, an object of this invention to provide an information transfer system which can present simultaneously a plurality of discrete displays.

It is an additional object of this invention to provide an improved device of the kind described which is capable of transmitting a pluarity of distinctive classes of information over a single cahnnel.

It is a further object of this invention to provide an improved educational and amusement device which permits the viewer to exercise a degree of control over the information presented.

It is another object of this invention to provide an improved educational and amusement device which permits a desired portion of the information presented to be selectively blanked.

It is still another object of this invention to provide an improved educational and amusement device which permits new information to be selectively substituted for a desired portion of the information currently being presented.

It is yet another object of this invention to provide an improved educational and amusement device which is reliable in operation and economical to use.

Other objects, features and advantages of this invention will be readily appreciated as the invention becomes better understood by reference to the following detailed description when read in connection with the accompanying drawings wherein:

FIG. 4 is a view of the face of the television receiving set illustrating a form of display in accordance with the principles of this invention.

Figure 1:
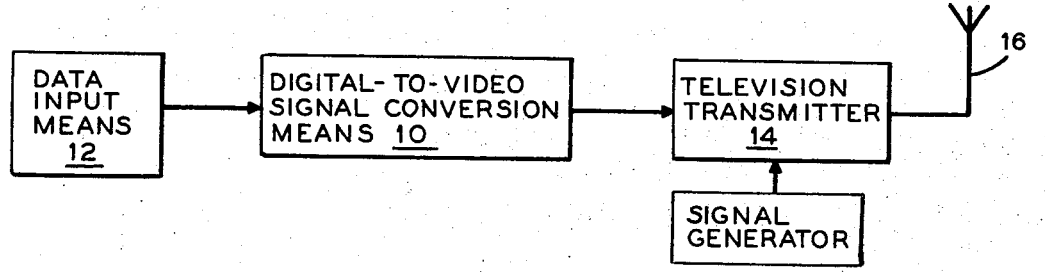
FIG. 1 is a view, in block form, of transmitting structure in accordance with the principles of this invention.

Referring now to FIG. 1, there is illustrated, in block form, structure in accordance with the principles of this invention. A digital-to-video signal conversion means 10 which can be in the form of the DIVCON manufactured by the Radio Corporation of America is coupled to receive desired data from a data input means 12 and transmit selectively said desired data to a television transmitter 14.

Figure 2:
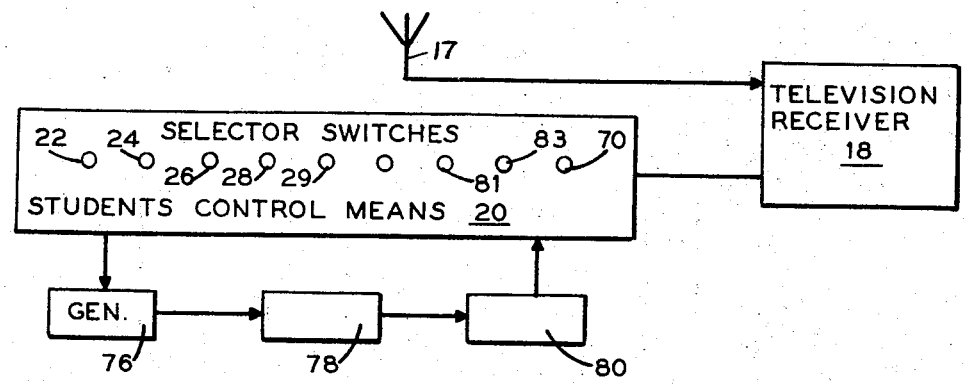
FIG. 2 is a view in block form, of receiving structure in accordance with the principles of this invention.

Television transmitter 14 is of standard design and construction and accepts the signals from the digital-to-video signal conversion means 10 and transmits them within a television channel via the antenna 16 to the receiver illustrated in FIG. 2. It is here noted that the television transmitter 14 also generates the appropriate horizontal and vertical synchronizing pulses which establish the television raster for each frame.

The digital-to-video signal conversion means, enables the output of data input means 12 such as data processing equipment, teletype machines or keyboards to be readily presented in alphanumeric form by television. The digital-to-video signal conversion means in the form of the DIVCON device receives its input information from the data input means and stores it in its memory for readout to digital video generator units dictated by a display format. The digital video generator units convert the digital data to standard television video signals on multiple output channels with up to 2000 character positions per display screen for 525 line interlaced TV equipment. An internal, fast random access core memory can accept write-in speeds of up to 500,000 characters per second, or can accept multiple inputs simultaneously. Direct access to the location of any character in any channel is possible. Thus, single characters can be changed as required. The display of single character symbols or groups of symbols can be accented by flashing or by underlining the characters which are to be emphasized. Additionally, where feasible, colored characters can be persented for emphasis. The character symbol from the DIVCON can be positioned to occupy any desired postion of the viewing screen of the television receiver.

The display control logic of the DIVCON is programmed to store information from the data input means, and to read the contents of the memory to a series of digital-video generator subsystems which translate the digital data into TV video in synchronism with the TV scanning periods.

When operating the DIVCON from a keyboard type of data input means, the system is alerted by means of a start of message code followed by a channel identification number; the message is typed into the channel selected; and an end message code signal closes the memory to noise or erroneous messages. Additionally, the DIVCON responds to all control functions normally found on an electric typewriter, such as line feed, return, space, shift and backspace, while facilities are incorporated for such other operating procedures such as erase character-blank; erase to end of line, erase to end of channel, underline data, flash data, and blank data.

The data input means 12 can be in the form of data processors, ticker circuits or keyboards. The instructions for writing data into the DIVCON device are the same for all of the input devices. Code conversion logic enables the system to work with data input means using different machine languages. The input logic accepts seven-bit parallel characters and a strobe signal from the data source. Data is stored in the random access core memory in eight bit code. The first six bits describe up to 64 character symbols, the seventh provides additional symbols and/or display control functions such as underline, flasher, blank data etc.; and the eighth bit is the parity bit. The size of the memory depends on the number of output video channels required, and on the number of character symbols required for each channel.

A multichannel system provides a separate video output signal for each channel, and the signals can be fed to any number of monitors over any distance. The system is readily adaptable to any raster-type scanning system because the timing signals are derived from a series of digital counters which are synchronized to the TV horizontal and vertical drive pulses.

The signals from the digital-to-video signal conversion means which can be in the form of a DIVCON or the like is fed to the conventional television transmitter 14.

Referring now to FIG. 2, there is illustrated a receiver 18 which includes an antenna 17 to receive signals from the transmitter 14 of FIG. 1. The receiver 18, which is generally of conventional design and construction receives the signals picked up by the antenna.

A viewer or student's control means 20 having a plurality of selector switches 22, 24, 26, 28, is coupled to selectively control the presentation of the display on the cathode ray tube of the television receiver.

In operation, a question and multiple choice answer can be presented within a first portion such as the top quarter segment 58 (FIG. 4) of the cathode ray tube, the remainder of the cathode ray tube being blank. A student, selecting what he regards to be the correct answer by operating one of the selector switches, unblanks a portion 60, 62, or 64 of the blank section of the cathode ray tube to display information pertaining to the correctness of the selection.

Figure 3:
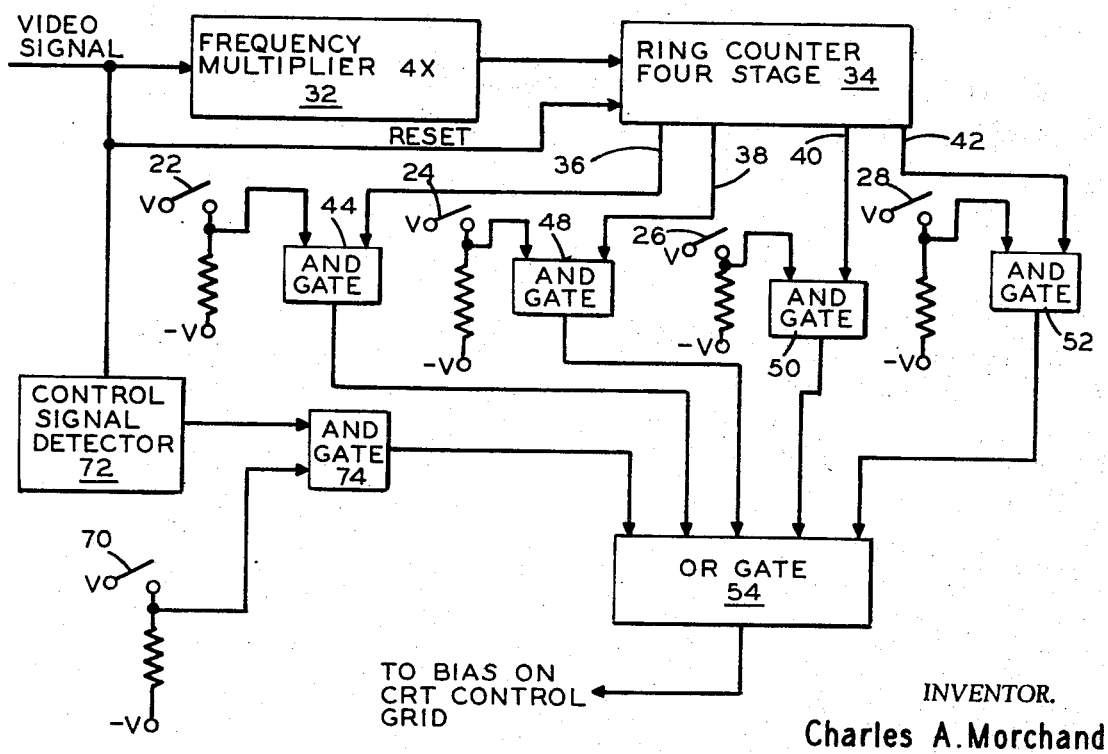
FIG. 3 is a schematic of the student's control means.

Referring to FIG. 3, there is illustrated a schematic of the student's control means 20 of FIG. 2. The sync pulse signal which marks the start of a frame in the television receiver is fed to a four to one frequency multiplier 32 which generates four pulse signals for each pulse signal received; the time duration of each pulse signal generated being one-fourth of the time spacing between consecutive sync pulse signals. Thus, the pulse signals generated by the frequency multiplier are at four times the rate of the sync pulse signals and can be used to divide the image on the cathode ray tube into a top quarter segment 58, a second quarter segment 60, a third quarter segment 62 and a bottom quarter segment 64. The signals generated by the frequency multiplier 32 are fed to and step a four stage ring counter 34 having four output terminals 36, 38, 40, 42. Thus, during that interval of time when the top quarter segment 58 of the picture on the cathode ray tube is being generated, a signal will be present on output terminal 36; during that interval of time when the second quarter segment 60 of the picture on the cathode ray tube is being generated, a signal will be present on output terminal 38; during that interval of time when the third quarter segment 62 of the picture on the cathode ray tube is being generated, a signal will be present on output terminal 40; and, during that interval of time when the bottom quarter segment 64 of the picture on the cathode ray tube is being generated, a signal will be present on output terminal 42.

The reset terminal of the ring counter 34 is coupled to receive the sync pulse to synchronize the operation of the ring counter to the generation of the image on the cathode ray tube.

The output terminal 36 of counter 34 is coupled to a first input terminal of an AND gate 44, the other input terminal of the AND gate 44 being coupled to selector switch 22.

The output terminal 38 of counter 34 is coupled to a first input terminal of an AND gate 48, the other input terminal of AND gate 48 being coupled to selector switch 24. The output terminal 40 of counter 34 is coupled to a first input terminal of an AND gate 50, the other input terminal of AND gate 50 being coupled to selector switch 26. The output terminal 42 of counter 34 is coupled to a first input terminal of an AND gate 52, the other input terminal of AND gate 52 being coupled to selector switch 28.

The output terminal of AND gates 44, 48, 50, 52 are coupled to feed an OR gate 54, the output of said OR gate 54 being coupled to the bias on the control grid of the cathode-ray tube of television receiver 18. When no signal is transmitted from the output of OR circuit 54 the bias is such to prevent video signals from modulating the electron beam of the tube, i.e. the tube is cut off and its screen blank. When OR circuit 54 transmits a signal normal bias is present on the control grid and the video signals intensity modulates the beam in the usual manner.

In operation, the digital-to-video signal conversion means which can take the form of a DIVCON manufactured by RCA or the like receives and stores from a data input 12 such as a keyboard or the like various bits of information.

For purposes of illustration, it shall be assumed that it is desired to query students on vocabulary, the task being to choose a synonym for the word "Thransonical" from the three words A-Brutal; B-Idle; C-Boastful.

In this instance, the following information is fed to the digital-to-video signal conversion means for presentation on the television receiver cathode ray tube.

The following to appear in the top one-fourth segment 58 of the cathode ray tube:

"Choose a synonym for the word THRANSONICAL from A-BRUTAL; B-IDLE; C-BOASTFUL."

The following to appear in the next occurring quarter segment 60 of the cathode ray tube:

"Wrong—Brutal means (dictionary definition)"

The following to appear in the third quarter segment 62 of the cathode ray tube:

"Wrong—Idle means (dictionary definition)"

The following to appear in the last quarter segment 64 of the cathode ray tube:

"Correct"

This information is fed from the digital-to-video signal conversion means to the television transmitter from where it is transmitted to and received by the television receiver 18.

The television receiver receives all of the information fed into the digital-to-video signal conversion means. However, only the top quarter segment 58 of the cathode ray tube of the television receiver will display information—the bottom three quarter segments being blank, as long as only switch 22 is closed.

Switch 22 is normally closed to prime AND gate 44 to pass pulse signals from terminal 36 of the ring counter. Thus, during the first or top quarter segment a pulse is fed via OR gate 54 to decrease the bias on the control grid of the cathode-ray tube and the video signals for that segment are displayed.

Switches 24, 26, 28 are normally open. Therefore AND gates 48, 50, 52 are normally conditioned to inhibit the passage of signals from terminals 38, 40, 42 of ring counter 34 representative of the second 60, third 62 and fourth 64 quarter segments of the cathode ray tube, and no information is presented in the second, third and fourth quarter segments of the cathode-ray tube because of the control grid of the cathode-ray tube is biased to cut off.

At some instant, the student will make a selection by operating one of the switches 24, 26, 28; switch 24 being selection A; switch 26 being selection B; and, switch 28 being selection C.

If it is assumed that the student selects B, switch 26 is operated. The operation of switch 26 primes AND gate 50 to pass a pulse signal from terminal 40 of the ring counter through OR gate 54, and the third quarter segment 62 of the cathode ray tube displays the information:

"Wrong—Idle means (followed by its dictionary definition)"

In a similar manner, if the student had selected "A-BRUTAL" by operating switch 24, then the second quarter segment 60 would have displayed the information:

"Wrong—Brutal means (followed by its dictionary definition)"

The selection by the student of the switch 28 which represents the last selection would result in the word "CORRECT" being displayed in the bottom quarter segment 64 of the cathode-ray tube.

After a short specific interval of time, another, and another, and still another problem can be presented for solution by the student.

In some instances, the problem or one or more of the answers may be too extensitve for presentation within the assigned quarter segment of the cathode-ray tube. For example, assume that the information for presentation within the second quarter segment—the dictionary definition of the word BRUTAL is too extensive to fit within the space limitations of the second quarter segment. In this instance two complete frames a selected interval apart of the desired information are sequentially transmitted to the television receiver. In the first and second frames, the information in the first, third and fourth quarter segments is identical. However, in the first frame, the second quarter segment 60 contains as much information as can be displayed without running over into the third quarter segment 62; and in the second frame, the second quarter segment 60 contains the remainder of the desired information.

The first frame and the second frame are each displayed for an interval sufficient to permit a student to read completely each frame, should that quarter segment be selected by a student.

The operation of switch 22, which, if desired, can be under the control of a local instructor, controls the display of the question. Thus, in those instances where reading skill of a student is being tested, a short paragraph can be presented for a predetermined interval of time as determined by the instructor. Thereafter, the student can operate switch 24 to obtain a multiple-choice question with each of the switches 26 and 28 representing one of the multiple choice answers.

In a similar manner, questions covering all areas from technical to the arts can be presented for analysis by students. Additionally, it is to be understood that the presentation of the question or information is not restricted to the use of words, but, in certain instances, designs or technical drawings can be presented.

In order to add to the versatility of the system it is also possible to give the transmitter some control over the display. For instance a unique control signal can be embedded in the transmitted signals. This signal when detected at the receiver by the detector 72 alerts AND gate 74 so that if switch 70 is closed a pulse passes through OR gate 54. Now detector 72 can contain a flip-flop which when it receives a first control signal is set and starts generating a pulse until another control signal is generated. Thus, with switch 70 closed the control signal can be used to display an entire frame instead of selected segments. For example, if switch 60 is closed and all switches 22, 24, 26 and 28 normally open, a question can first be presented on the entire screen and thereafter a student can pick one of four possible answers. In addition, similar control signals can be used to control AND gates 44, 48, 50 and 52 so that they are not operative unless a control signal is present.

Although a digital data input means operating in cooperation with a DIVCON has been shown, it should be apparent that a programmed slide projector and television camera could be used as a source of the information.

It should be realized that although the screen is divided into four regions it should be obvious that a greater or lesser number is within the scope of the invention. In addition two or more switches can be simultaneously depressed to display a larger portion of the screen.

While the control signal is only used to control the AND gate 74 and switch 70, it should be realized that the control signal and switching arrangements of my U.S. Patent No. 3,345,758 can be employed to operate in combination with the structure here disclosed.

Obviously many modifications and variations of the present invention are possible in the light of the above teachings. It is, therefore, to be understood that within the scope of the appended claims the invention may be practiced otherwise than as specifically described.

What is claimed is:
1. An educational apparatus comprising: means for generating at least fields of television information and synchronizing signals associated with said fields of television information, said fields of television information being divided into at least first, second and third visual areas; and means for receiving said fields of television information and said synchronizing signals, said receiving means comprising controllable display means for displaying said fields of television signals, means receiving said synchronizing signals for generating first, second and third control signals, respectively related to said first, second and third visual areas, means for continuously transmitting said first control signals to said controllable display means for controlling the latter to continuously display the first visual area, and selectively operable transmitting means for controlling the transmission of said second and third control signals to said controllable display means so that the second and third visual areas are only selectively displayed.

2. The educational apparatus of claim 1 wherein said receiving means includes a television receiver.

3. The educational apparatus of claim 1 wherein said selectively operable transmitting means includes a plurality of selectively operable manual switches.

4. The educational apparatus of claim 1 wherein said means for generating at least fields of television information and synchronizing signals includes a programmed device for generating televiison frames of information.

5. The educational apparatus of claim 1 wherein said means for generating at least fields of television information and synchronizing signals includes digital-to-video signal conversion means.

References Cited

UNITED STATES PATENTS

| | | | |
|---|---|---|---|
| 3,180,931 | 4/1965 | Morchand | 35—8X |
| 3,256,386 | 6/1966 | Morchand | 178—5.6 |
| 3,273,260 | 9/1966 | Walker | 35—9 |
| 3,345,758 | 10/1967 | Morchand | 35—9 |

WILLIAM H. GRIEB, Primary Examiner

U.S. Cl. X.R.

178—5.6